(12) United States Patent
Chae

(10) Patent No.: US 7,319,503 B2
(45) Date of Patent: Jan. 15, 2008

(54) METHOD FOR CUTTING LIQUID CRYSTAL DISPLAY PANEL

(75) Inventor: Kyung-Su Chae, Taegu-kwangyokshi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/255,991

(22) Filed: Sep. 27, 2002

(65) Prior Publication Data

US 2003/0168055 A1 Sep. 11, 2003

(30) Foreign Application Priority Data

Mar. 9, 2002 (KR) .......................... 10-2002-12752

(51) Int. Cl.
*G02F 1/13* (2006.01)
(52) U.S. Cl. ..................................... 349/187; 349/158
(58) Field of Classification Search ................ 349/158, 349/187
See application file for complete search history.

(56) References Cited

U.S. PATENT DOCUMENTS

| | | | |
|---|---|---|---|
| 3,978,580 A | 9/1976 | Leupp et al. | |
| 4,094,058 A | 6/1978 | Yasutake et al. | |
| 4,653,864 A | 3/1987 | Baron et al. | |
| 4,691,995 A | 9/1987 | Yamazaki et al. | |
| 4,775,225 A | 10/1988 | Tsuboyama et al. | |
| 5,247,377 A | 9/1993 | Omeis et al. | 359/76 |
| 5,263,888 A | 11/1993 | Ishihara et al. | |
| 5,278,685 A * | 1/1994 | Iwamoto et al. | 349/187 |
| 5,379,139 A | 1/1995 | Sato et al. | |
| 5,406,989 A | 4/1995 | Abe | |
| 5,499,128 A | 3/1996 | Hasegawa et al. | |
| 5,507,323 A | 4/1996 | Abe | |
| 5,511,591 A | 4/1996 | Abe | 141/7 |
| 5,539,545 A | 7/1996 | Shimizu et al. | |
| 5,548,429 A | 8/1996 | Tsujita | |
| 5,642,214 A | 6/1997 | Ishii et al. | 349/96 |
| 5,680,189 A | 10/1997 | Shimizu et al. | |
| 5,742,370 A | 4/1998 | Kim et al. | 349/124 |
| 5,757,451 A | 5/1998 | Miyazaki et al. | |
| 5,852,484 A | 12/1998 | Inoue et al. | |
| 5,854,664 A | 12/1998 | Inoue et al. | |

(Continued)

FOREIGN PATENT DOCUMENTS

EP 1003066 5/2000

(Continued)

OTHER PUBLICATIONS

Office Action issued by the Japanese Patent Office on Jul. 12, 2006 (w/ English Translation).

*Primary Examiner*—Thoi V. Duong
(74) *Attorney, Agent, or Firm*—McKenna Long & Aldridge LLP

(57) ABSTRACT

A method for cutting a liquid crystal display panel is disclosed in the present invention. The method includes forming a plurality of unit liquid crystal display panels on first and second mother substrates, wherein the unit liquid crystal display panels have at least two different sizes, forming a plurality of first scribing lines on a surface of the first mother substrate, rotating the first and second mother substrates by 90°, and forming a plurality of second scribing lines on the surface of the first mother substrate.

20 Claims, 7 Drawing Sheets

U.S. PATENT DOCUMENTS

| | | |
|---|---|---|
| 5,861,932 A | 1/1999 | Inata et al. |
| 5,875,922 A | 3/1999 | Chastine et al. |
| 5,952,676 A | 9/1999 | Sato et al. |
| 5,956,112 A | 9/1999 | Fujimori et al. |
| 6,001,203 A | 12/1999 | Yamada et al. |
| 6,011,609 A | 1/2000 | Kato et al. ................... 349/190 |
| 6,016,178 A | 1/2000 | Kataoka et al. ............. 349/117 |
| 6,016,181 A | 1/2000 | Shimada |
| 6,055,035 A | 4/2000 | Von Gutfeld et al. ........ 349/187 |
| 6,163,357 A | 12/2000 | Nakamura ................... 349/155 |
| 6,195,149 B1* | 2/2001 | Kodera et al. ............... 349/187 |
| 6,219,126 B1 | 4/2001 | Von Gutfeld |
| 6,226,067 B1 | 5/2001 | Nishiguchi et al. ......... 349/155 |
| 6,236,445 B1 | 5/2001 | Foschaar et al. |
| 6,304,306 B1 | 10/2001 | Shiomi et al. ................ 349/88 |
| 6,304,311 B1 | 10/2001 | Egami et al. |
| 6,337,730 B1 | 1/2002 | Ozaki et al. |
| 6,414,733 B1 | 7/2002 | Ishikawa et al. ............ 349/110 |
| 2001/0021000 A1 | 9/2001 | Egami et al. |

FOREIGN PATENT DOCUMENTS

| | | |
|---|---|---|
| JP | 49-36371 | 9/1974 |
| JP | 51-7873 | 3/1976 |
| JP | 51-65656 | 6/1976 |
| JP | 52-149725 | 12/1977 |
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | H06-018829 | 1/1994 |
| JP | 6-48755 | 2/1994 |
| JP | 6-51256 | 2/1994 |
| JP | H06-064229 | 3/1994 |
| JP | 6-148657 | 5/1994 |
| JP | 6-160871 | 6/1994 |
| JP | H06-194637 | 7/1994 |
| JP | 6-235925 | 8/1994 |
| JP | 6-313870 | 8/1994 |
| JP | 6-265915 | 9/1994 |
| JP | 7-84268 | 3/1995 |
| JP | 7-128674 | 5/1995 |
| JP | 7-181507 | 7/1995 |
| JP | H07-275770 | 10/1995 |
| JP | H07-275771 | 10/1995 |
| JP | H08-076133 | 3/1996 |
| JP | 8-95066 | 4/1996 |
| JP | 8-101395 | 4/1996 |
| JP | 8-106101 | 4/1996 |
| JP | H08-110504 | 4/1996 |
| JP | H08-136937 | 5/1996 |
| JP | 8-171094 | 7/1996 |
| JP | 8-190099 | 7/1996 |
| JP | H08-173874 | 7/1996 |
| JP | 8-240807 | 9/1996 |
| JP | 8-320460 | 12/1996 |
| JP | 9-5762 | 1/1997 |
| JP | 9-26578 | 1/1997 |
| JP | H09-001026 | 1/1997 |
| JP | 9-61829 | 3/1997 |
| JP | 9-73075 | 3/1997 |
| JP | 9-73096 | 3/1997 |
| JP | H09-094500 | 4/1997 |
| JP | 9-127528 | 5/1997 |
| JP | 9-230357 | 9/1997 |
| JP | 9-278470 | 10/1997 |
| JP | 9-281511 | 10/1997 |
| JP | 9-311340 | 12/1997 |
| JP | 09-325328 | * 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-197856 | 7/1998 |
| JP | 10-221700 | 8/1998 |
| JP | 10-282512 | 10/1998 |
| JP | 10-333157 | 12/1998 |
| JP | 10-333159 | 12/1998 |
| JP | 11-133438 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-142864 | 5/1999 |
| JP | 11-174477 | 7/1999 |
| JP | 11-212045 | 8/1999 |
| JP | 11-248930 | 9/1999 |
| JP | H11-262712 | 9/1999 |
| JP | H11-264991 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-066218 | 3/2000 |
| JP | 2000-093866 | 4/2000 |
| JP | 2000-137235 | 5/2000 |
| JP | 2000-147528 | 5/2000 |
| JP | 2000-193988 | 7/2000 |
| JP | 2000-241824 | 8/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-100767 | 4/2001 |
| JP | 2001-117105 | 4/2001 |
| JP | 2001-117109 | 4/2001 |
| JP | 2001-133745 | 5/2001 |

| | | | | | | |
|---|---|---|---|---|---|---|
| JP | 2001-133794 | 5/2001 | | JP | 2002-122872 | 4/2002 |
| JP | 2001-133799 | 5/2001 | | JP | 2002-122873 | 4/2002 |
| JP | 2001-142074 | 5/2001 | | JP | 2002-131762 | 5/2002 |
| JP | 2001-147437 | 5/2001 | | JP | 2002-139734 | 5/2002 |
| JP | 2001-154211 | 6/2001 | | JP | 2002-156518 | 5/2002 |
| JP | 2001-166272 | 6/2001 | | JP | 2002-169166 | 6/2002 |
| JP | 2001-166310 | 6/2001 | | JP | 2002-169167 | 6/2002 |
| JP | 2001-183683 | 7/2001 | | JP | 2002-182222 | 6/2002 |
| JP | 2001-201750 | 7/2001 | | JP | 2002-202512 | 7/2002 |
| JP | 2001-209052 | 8/2001 | | JP | 2002-202514 | 7/2002 |
| JP | 2001-209056 | 8/2001 | | JP | 2002-214626 | 7/2002 |
| JP | 2001-209057 | 8/2001 | | JP | 2002-229042 | 8/2002 |
| JP | 2001-209058 | 8/2001 | | JP | 2002-236276 | 8/2002 |
| JP | 2001-209060 | 8/2001 | | JP | 2002-258299 | 8/2002 |
| JP | 2001-215459 | 8/2001 | | JP | 2002-236292 | 9/2002 |
| JP | 2001-222017 | 8/2001 | | JP | 2002-277865 | 9/2002 |
| JP | 2001-235758 | 8/2001 | | JP | 2002-277866 | 9/2002 |
| JP | 2001-255542 | 9/2001 | | JP | 2002-277881 | 9/2002 |
| JP | 2001-264782 | 9/2001 | | JP | 2002-287156 | 10/2002 |
| JP | 2001-272640 | 10/2001 | | JP | 2002-296605 | 10/2002 |
| JP | 2001-281675 | 10/2001 | | JP | 2002-311438 | 10/2002 |
| JP | 2001-281678 | 10/2001 | | JP | 2002-311440 | 10/2002 |
| JP | 2001-282126 | 10/2001 | | JP | 2002-311442 | 10/2002 |
| JP | 2001-305563 | 10/2001 | | JP | 2002-323687 | 11/2002 |
| JP | 2001-330837 | 11/2001 | | JP | 2002-323694 | 11/2002 |
| JP | 2001-330840 | 11/2001 | | JP | 2002-333628 | 11/2002 |
| JP | 2001-356353 | 12/2001 | | JP | 2002-333635 | 11/2002 |
| JP | 2001-356354 | 12/2001 | | JP | 2002-333843 | 11/2002 |
| JP | 2002-14360 | 1/2002 | | JP | 2002-341329 | 11/2002 |
| JP | 2002-23176 | 1/2002 | | JP | 2002-341355 | 11/2002 |
| JP | 2002-49045 | 2/2002 | | JP | 2002-341356 | 11/2002 |
| JP | 2002-079160 | 3/2002 | | JP | 2002-341357 | 11/2002 |
| JP | 2002-080321 | 3/2002 | | JP | 2002-341358 | 11/2002 |
| JP | 2002-82340 | 3/2002 | | JP | 2002-341359 | 11/2002 |
| JP | 2002-90759 | 3/2002 | | JP | 2002-341362 | 11/2002 |
| JP | 2002-90760 | 3/2002 | | KR | 2000-35302 | 6/2000 |
| JP | 2002-107740 | 4/2002 | | | | |
| JP | 2002-122870 | 4/2002 | | * cited by examiner | | |

METHOD FOR CUTTING LIQUID CRYSTAL DISPLAY PANEL

This application claims the benefit of the Korean Application No. P2002-012752 filed on Mar. 9, 2002, which is hereby incorporated by reference.

BACKGROUND OF THE INVENTION

1. Field of the Invention

The present invention relates to a liquid crystal display panel, and more particularly, to a method for cutting a liquid crystal display panel. Although the present invention is suitable for a wide scope of applications, it is particularly suitable for cutting liquid crystal display panels having different sizes from large mother substrates.

2. Discussion of the Related Art

Generally, a liquid crystal display (LCD) device is a display device for displaying images by adjusting light transmittance of liquid crystal cells by individually supplying data signals corresponding to image information to the liquid crystal cells, which are aligned in a matrix form.

In the LCD device, a plurality of thin film transistor (TFT) array substrates are formed at a large mother substrate and a plurality of color filter substrates are formed at another mother substrate. Then, by attaching the two mother substrates, a plurality of unit LCD panels are formed and cut into unit LCD panels to improve yield.

Conventionally, the cutting process includes forming a scribing line on the surface of the mother substrate with a wheel having a hardness higher than the substrate and transmitting a crack along the scribing line. The cutting process of the unit LCD panels will be described in detail with reference to the accompanied drawings.

FIG. 1 is a schematic view showing a structure of a unit LCD panel formed in a thin film transistor array substrate and a color filter substrate attached to each other.

As shown in FIG. 1, an LCD panel 10 includes an image display unit 13 in which a plurality of liquid crystal cells are aligned in a matrix form, a gate pad unit 14 connected to gate lines of the image display unit 13 and a data pad unit 15 connected to data lines. At this time, the gate pad unit 14 and the data pad unit 15 are formed at the marginal portion of the TFT array substrates 1 that do not overlap the color filter substrates 2. The gate pad unit 14 supplies a scan signal which is supplied from a gate driver integrated circuit (IC) to the gate lines of the image display unit 13 and the data pad unit 15 supplies image information which is supplied from a data driver integrated IC to the data lines of the image display unit 13.

The data lines for applying image information and the gate lines for applying scan signals are arrayed to vertically cross each other on the TFT array substrate 1 of the image display unit 13. At the crossing portion, a TFT for switching the liquid crystal cells, a pixel electrode connected to the TFT for driving the liquid crystal cells, and a passivation layer are formed on the front surface of the TFT to protect the data lines, the gate lines, the pixel electrodes, and the TFT.

Also, on the color filter substrate 2 of the image display unit 13, color filters which are spread to be divided into respective regions by a black matrix. Also, a common electrode is formed to correspond to the pixel electrode formed on the TFT array substrate 1.

A cell-gap is formed so that the TFT array substrates 1 and the color filter substrates 2 oppose to each other and are regularly separated. The two substrates are attached by a sealant (not shown), which is formed at the circumference of the image display unit 13. In addition, a liquid crystal layer (not shown) is formed in a space between the TFT array substrates 1 and the color filter substrates 2.

FIG. 2 is a schematic cross-sectional view illustrating that a plurality of unit LCD panels are formed by attaching a first mother substrate where the TFT array substrates are formed, and a second mother substrate where the color filter substrates are formed.

With reference to FIG. 2, a side end portion of each TFT array substrate 1 is protruded more than that of the color filter substrate 2, since the gate pad unit 14 and the data pad unit 15 are formed at the marginal portion of the TFT array substrates 1 that do not overlap the color filter substrates 2, as described above.

Therefore, the color filter substrates 2 on the first mother substrate 20 are formed to be smaller than the TFT array substrates 1 as much as a dummy region 31.

Also, each unit liquid crystal panel is appropriately positioned to maximize the use of the first and second mother substrates 20 and 30. Generally, the unit liquid crystal panels are formed to be separated by a dummy region 32. A dummy region 21 for a process margin is also formed in the marginal portions of the first and second mother substrates 20 and 30.

After the first mother substrate 20 where the TFT array substrates 1 are formed and the second mother substrate 30 where the color filter substrates 2 are attached to each other, the attached substrates are cut into unit liquid crystal panels. At this time, the dummy region 31 formed at the color filter substrates 2 of the second mother substrate 30, the dummy region 32 for separating the unit liquid crystal panels, and the dummy region 21 formed at the marginal portion of the first and second mother substrates 20 and 30, are simultaneously removed from the attached substrates.

FIG. 3 is a schematic plane view illustrating that a plurality of unit LCD panels are formed on a large size mother substrate. As shown in the drawing, six LCD panels 110 are formed in the mother substrate considering the size of the mother substrate 100 and LCD panel 110.

In case of fabricating LCD panels with a larger size without increasing the size of the mother substrate 100, only three LCD panels 120 may be formed in the mother substrate 100 and the portion of the mother substrate 100 that the LCD panel is not formed is discarded, as shown in FIG. 4.

Therefore, efficiency in using the mother substrate 100 is degraded, thereby reducing productivity and increasing product cost.

SUMMARY OF THE INVENTION

Accordingly, the present invention is directed to a method for cutting a liquid crystal display panel that substantially obviates one or more problems due to limitations and disadvantages of the related art.

Another object of the present invention is to provide a method for cutting a liquid crystal display panel for fabricating LCD panels on a large sized mother substrate having different sizes and cutting the LCD panels into individual unit LCD panels.

To achieve these and other advantages and in accordance with the purpose of the present invention, as embodied and broadly described herein, a method for cutting an LCD panel includes forming a plurality of unit liquid crystal display panels on first and second mother substrates, wherein the unit liquid crystal display panels have at least two different sizes, forming a plurality of first scribing lines on a surface of the first mother substrate, rotating the first and second mother substrates by 90°, and forming a plurality of second scribing lines on the surface of the first mother substrate.

In another aspect of the present invention, a method for cutting an LCD panel includes forming a plurality of unit liquid crystal display panels on first and second mother substrates, the first and second mother substrates having first and second regions, forming a plurality of scribing lines on the surface of the first mother substrate, separating the first and second regions by cutting the first and second mother substrates along the first scribing lines, rotating the first region by 90°, forming a plurality of second scribing lines on the first region, separating a plurality of unit panels by cutting the first region along the second scribing lines, rotating the second region by 90°, forming a third scribing line on the second region, and separating a plurality of unit panels from the first region by cutting the second region along the third scribing line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings.

Figure 4:
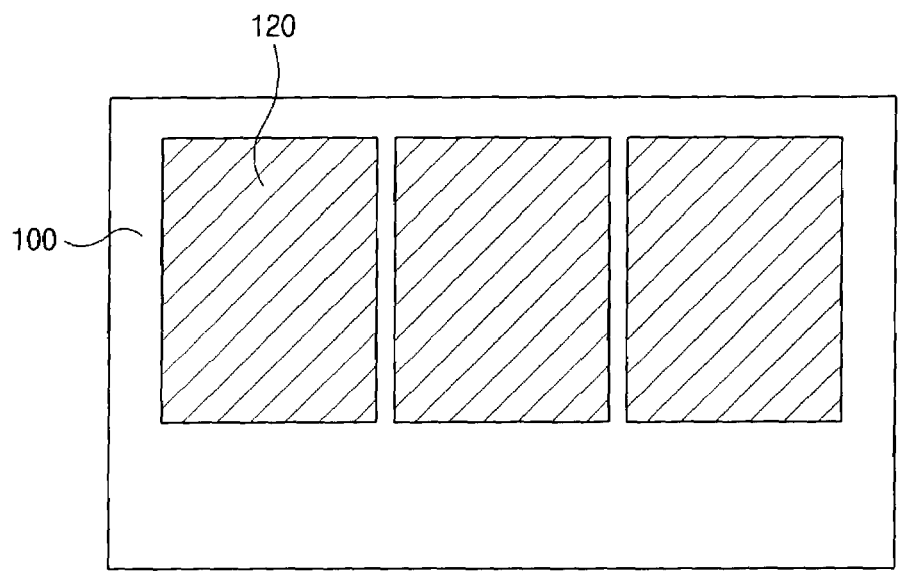
FIG. 4 is a schematic plane view showing liquid crystal display panels having a size larger than those in FIG. 3.
Figure 5:
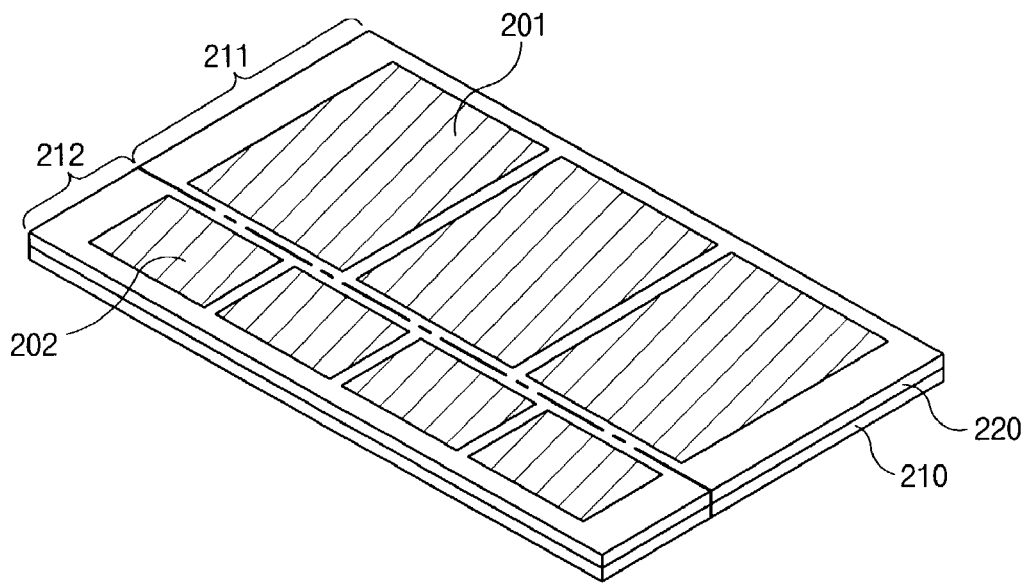
FIG. 5 is an exemplary view showing a mother substrate where unit LCD panels are formed with different sizes.

FIG. 5 is an exemplary view showing a mother substrate where unit LCD panels are formed with different sizes. As shown in the drawing, a first region 211 of the mother substrate has three LCD panels 201 with a first size formed on the attached first and second mother substrates 210 and 220. A second region 212 of the mother substrate has four LCD panels 202 with a second size formed thereon. Therefore, the four LCD panels 202 having the second size can be further formed at the second region of the mother substrate. Conventionally, this region is discarded, as shown in FIG. 4. Thus, efficiency in using the mother substrate is maximized in the present invention.

Figure 1:
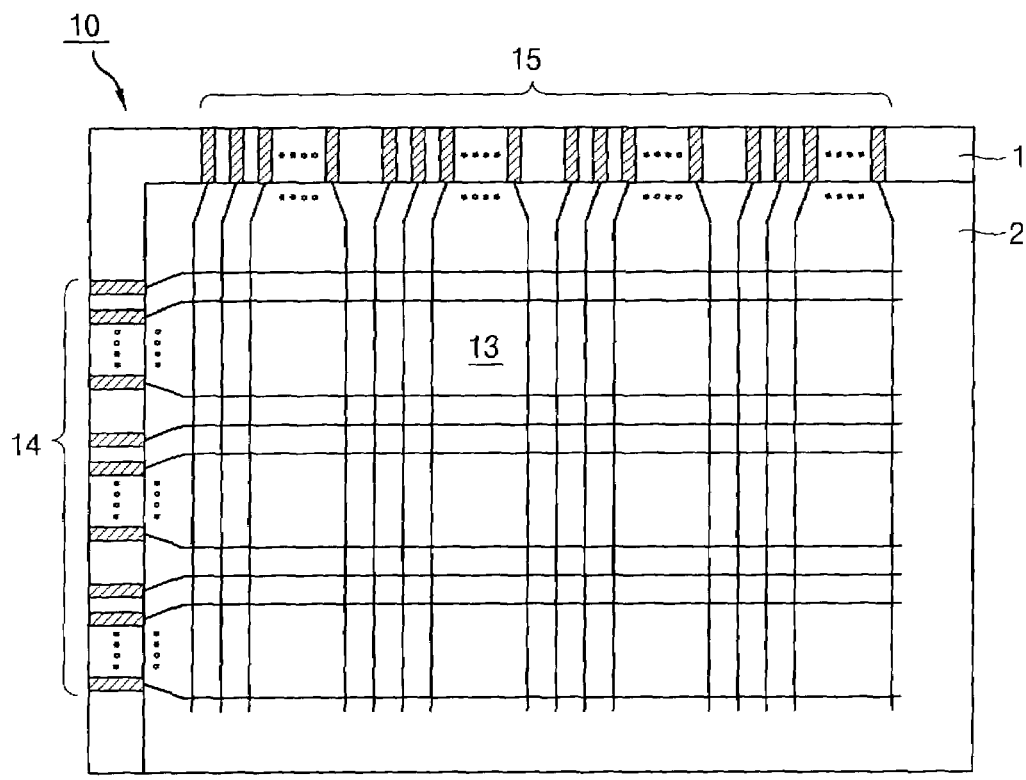
FIG. 1 is a schematic plane view showing a structure of a unit liquid crystal display panel formed in a thin film transistor (TFT) array substrate and a color filter substrate attached to each other.
Figure 2:
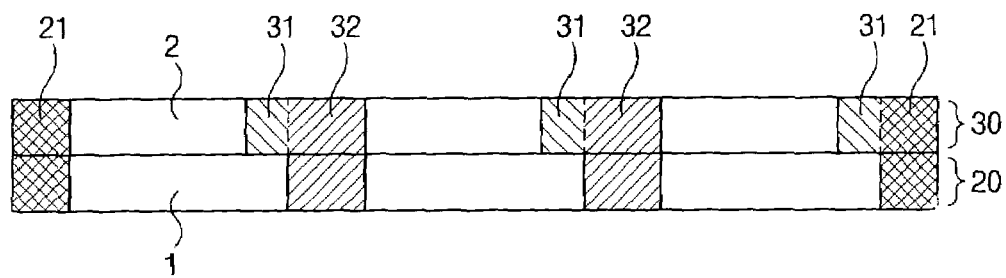
FIG. 2 is a schematic cross-sectional view showing a plurality of unit liquid crystal display panels formed in a first mother substrate including the TFT array substrate and a second mother substrate including the color filter substrate of FIG. 1.
Figure 3:
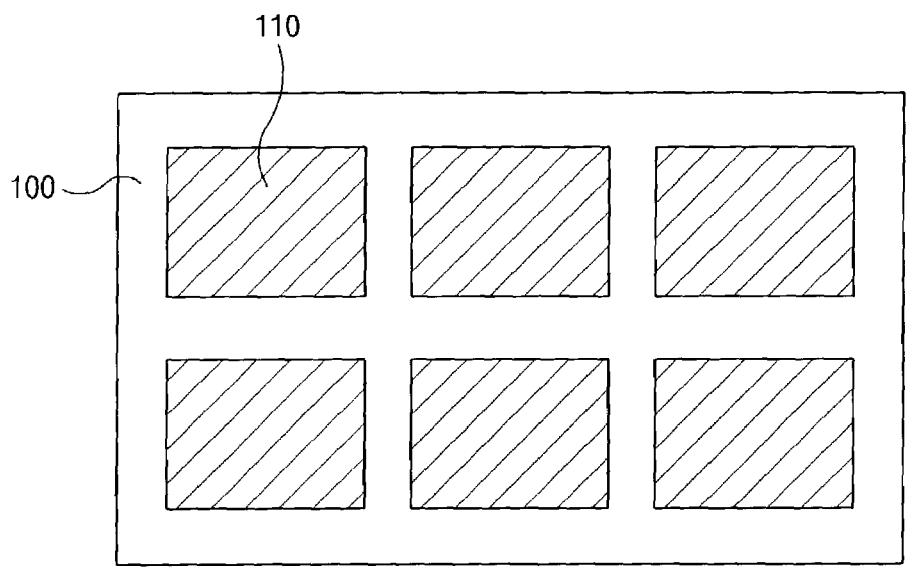
FIG. 3 is a schematic plane view showing a plurality of unit liquid crystal display panels formed in a large sized mother substrate.

Although not shown on the drawing in detail, the LCD panels 201 and 202 are formed in the TFT array substrate and the color filter substrate that are attached to each other, and a side end portion of the TFT array substrate is protruded more than that of the color filter substrate as much as a gate pad unit and a data pad unit formed on the TFT array substrate, as shown in FIG. 1.

Hereinafter, a method for cutting an LCD panel for separating a plurality of LCD panels formed on the mother substrate of FIG. 5 in accordance with the present invention, as shown in FIGS. 6A to 6D, will be described in detail.

Figure 6A:
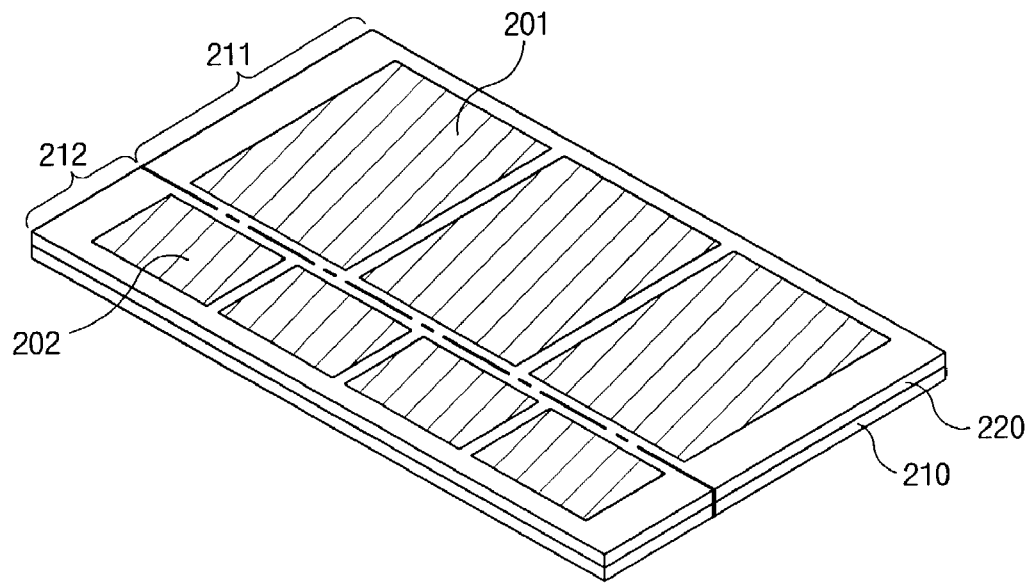
FIGS. 6A to 6D illustrate sequential processes for cutting the unit LCD panels formed on the mother substrate of FIG. 5 in accordance with a first embodiment of the present invention.

Initially referring to FIG. 6A, the first and second regions 211 and 212 are divided on the first and second mother substrates 210 and 220 which are attached to face into each other. LCD panels 201 and 202 having different sizes are formed in the first region 211 and the second region 212, respectively.

Generally, a fabrication of an LCD device is progressed along the direction parallel to the longer side of the first and second mother substrates 210 and 220 in the first and second mother substrates 210 and 220, thereby providing the stability in fabrication and maximizing the space of the process equipment. In case that the first scribing lines 221A to 221D are formed in parallel to the shorter side of the first and second mother substrates 210 and 220, it is desirable that the first and second mother substrates are rotated by 90° in advance.

Figure 6B:
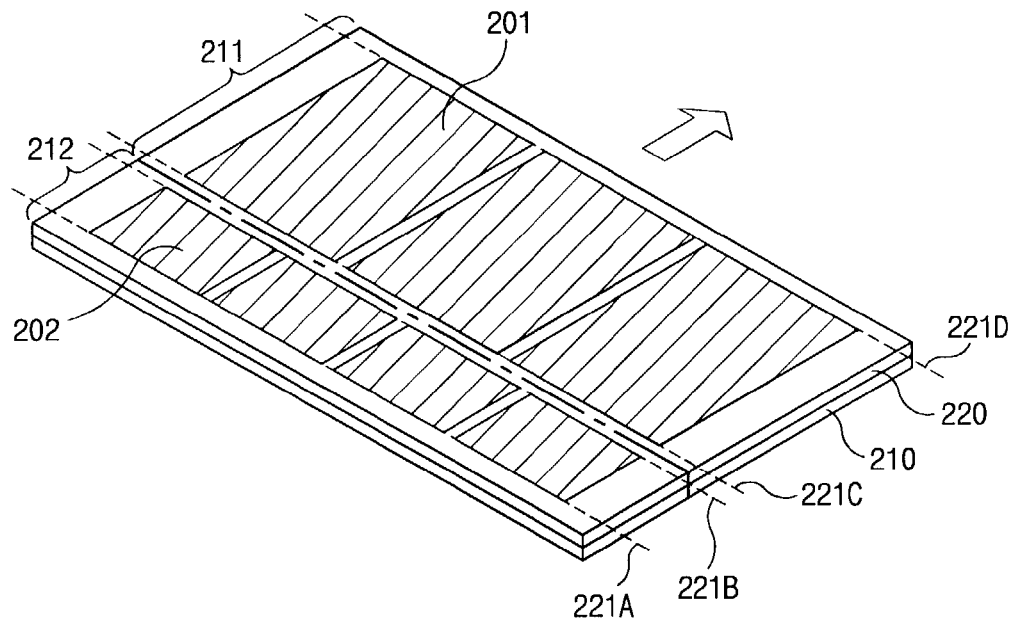

Then, as shown in FIG. 6B, first scribing lines 221A to 221D are sequentially formed on the surface of the first mother substrate 210 in the direction to divide the first and second regions 211 and 212 of the first mother substrate 210.

The first scribing lines 221A to 221D are formed in a straight line extended from the shorter or longer side of the LCD panels 201 and 202 formed in the first and second regions 211 and 212 of the first mother substrate 210 and divide a region for forming the LCD panels 201 and 202 or a region to be discarded on the first mother substrate 210.

In the first embodiment of the present invention, the first scribing lines 221A and 221B are formed in a straight line extended from the shorter side of the LCD panel 201 formed in the first region 211. On the other hand, the first scribing lines 221C and 221D are formed in a straight line extended from the longer side of the LCD panel 202 formed in the second region 212.

Figure 6C:
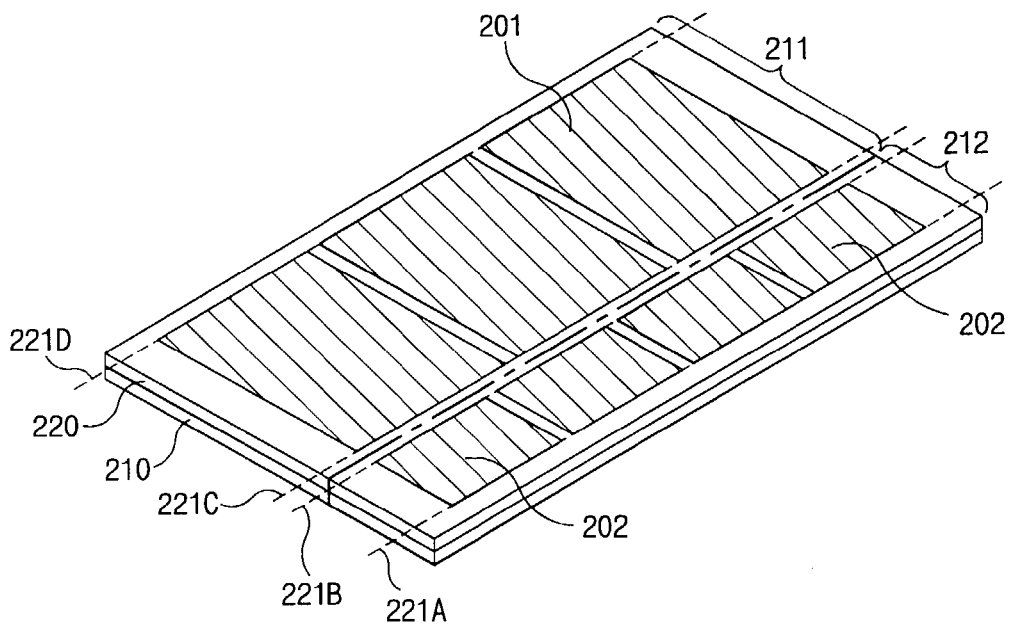

As shown in FIG. 6C, the first and second mother substrates 210 and 220 are rotated by 90°.

Figure 6D:
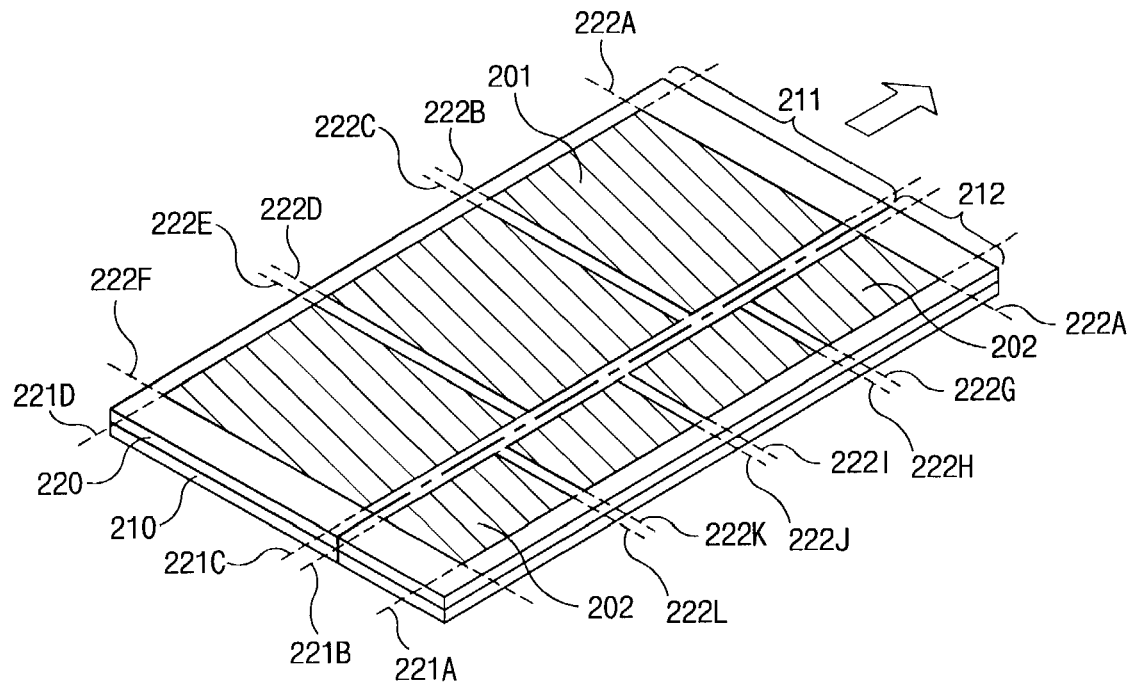

In FIG. 6D, the second scribing lines 222A to 222L are sequentially formed on the surface of the first mother substrate 210 in the direction to separate the LCD panels 201 and 202 formed in the first and second regions 211 and 212 of the first mother substrate 210 into individual unit LCD panels.

The second scribing lines 222A to 222L are formed in a straight line to be extended from the shorter or longer side of the LCD panels 201 and 202 formed in the first and second regions 211 and 212 of the first mother substrate 210 and divides a region for forming the LCD panels 201 and 202 of the first mother substrate 210 and a region to be discarded.

In the first embodiment of the present invention, the second scribing lines 222A to 222F are formed in a straight line to be extended from the longer side of the LCD panel 201 formed in the first region 211. The second scribing lines 222G to 222L are formed in a straight line to be extended from the shorter side of the LCD panel 202 formed in the second region 212.

The second scribing lines 222A and 222F are formed in a straight line connected to the longer side of the LCD panels 201 formed in the first region 211 and the shorter side of the LCD panels 202 formed in the second region 212, so that the region of the first mother substrate 210 to be discarded is determined.

However, the second scribing lines 222B to 222E are formed only in the first region 211 so that the LCD panel 202 formed in the second region 212 is not damaged by the second scribing lines 222B to 222E. Similarly, the second scribing lines 222G to 222L are formed only in the second region 212 so that the LCD panels formed in the first region 211 are not damaged by the second scribing lines 222G to 222L.

Therefore, the second scribing lines 222B to 222E and 222G to 222L are formed at a predetermined location on the surface of the first mother substrate 210. However, the breaking process may not be easily controlled since cracks tend to be progressed under a normal condition.

In the first embodiment of the present invention, since the first scribing lines 221B and 221C are formed to be perpendicular to the second scribing lines 222B to 222E and 222G to 222L on the surface of the first mother substrate 210, transmission of the cracks can be prevented by the first scribing lines 221B and 221C. Therefore, the first scribing lines 221A to 221D are formed before forming the second scribing lines 222B to 222E and 222G to 222L.

As described above, the first mother substrate 210 is divided by the region having the LCD panels 201 and 202 formed thereon and the region to be discarded. Thereafter, identical processes are used to divide the regions on the surface of the second mother substrate 220 after reversing the first and second mother substrates 210 and 220.

Finally, the LCD panels 201 and 202 formed on the first and second mother substrates 210 and 220 are separated into individual unit LCD panels by transmitting the cracks to the vertical direction from the surface of the first and second mother substrates 210 and 220 where the scribing lines are formed.

FIGS. 7A to 7D are exemplary views showing steps for separating individual unit LCD panels by cutting LCD panels which are fabricated on the mother substrate of FIG. 5 in accordance with a second embodiment of the present invention. A method for cutting the LCD panels in accordance with the second embodiment of the present invention will be described in detail with reference to the drawing.

Figure 7A:
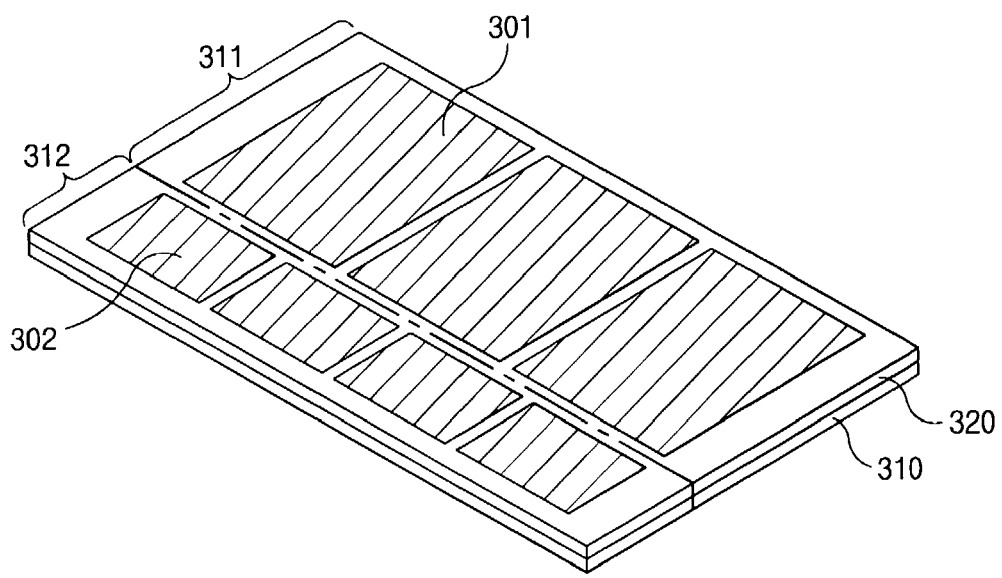
FIGS. 7A to 7D illustrate sequential processes for cutting the unit LCD panels formed on the mother substrate of FIG. 5 in accordance with a second embodiment of the present invention.

As shown in FIG. 7A, the first and second regions 311 and 312 are divided on the first and second mother substrates 310 and 320, which are attached to face into each other. LCD panels 301 and 302 having different sizes are formed on the first and second regions 311 and 312.

Generally, the first and second mother substrates 310 and 320 are processed along the direction parallel to the longer side of the first and second mother substrates 310 and 320. Thus, the space for the equipment may be efficiently utilized. However, in case that the first scribing line 321, which will be described below, is formed in the direction parallel to the shorter side of the first and second mother substrates 310 and 320, it is desirable that the first and second mother substrates 310 and 320 are rotated by 90°.

Figure 7B:
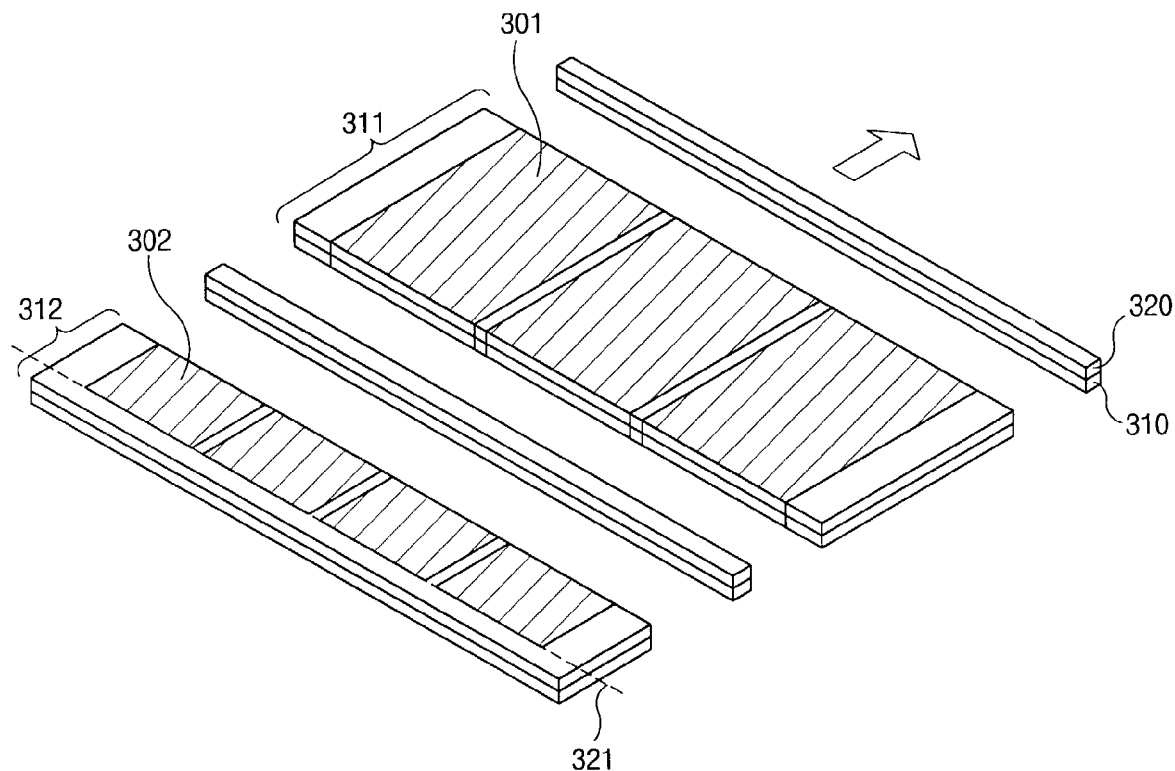

As shown in FIG. 7B, the first scribing line 321 is sequentially formed on the surface of the first and second mother substrates 310 and 320. Thereafter, the first and second regions 311 and 312 are separated by cutting the first and second mother substrates 310 and 320 along the first scribing line 321.

The first scribing line 321 is formed in a straight line extended from either the shorter or longer side of the LCD panels 301 and 302 formed in the first and second regions 311 and 312, and separates the first and second regions 311 and 312 where the LCD panels 301 and 302 are formed on the first and second mother substrates 310 and 320 and the region to be discarded.

In the second embodiment of the present invention, the first region 311 is separated from the mother substrates along a straight line extended from the shorter side of the LCD panels 301. On the other hand, the second region 312 is separated from the mother substrates along a straight line extended from the longer side of the LCD panels 302.

Figure 7C:
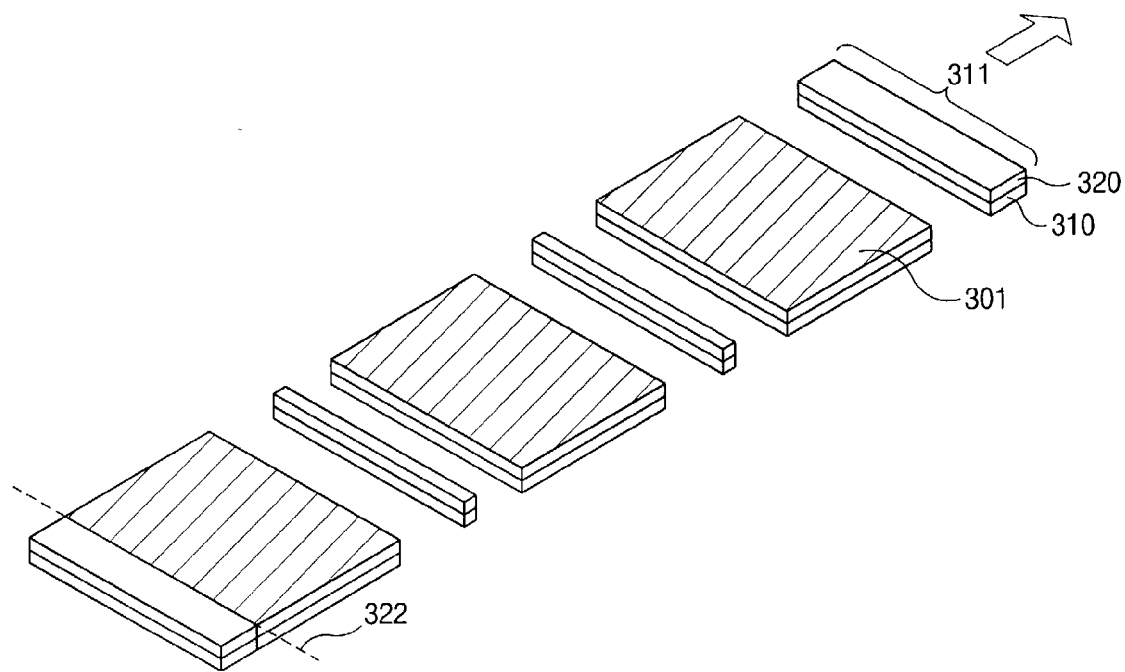

As shown in FIG. 7C, the separated first region 311 is rotated by 90°, and each unit LCD panel 301 having a first size is further separated by cutting the first region 311 along a second scribing line 322 after sequentially forming the second scribing line 322 on the first region 311.

The second scribing line 322 is sequentially formed along the shorter or longer side of the LCD panels 301 formed on the first region 311 of the first and second mother substrates 310 and 320. Thereafter, the LCD panels 301 on the first and second mother substrates 310 and 320 are separated into each LCD panel, and the remaining region will be discarded. In the second embodiment of the present invention, the first region 311 is separated along the longer side of the LCD panels 301.

Figure 7D:
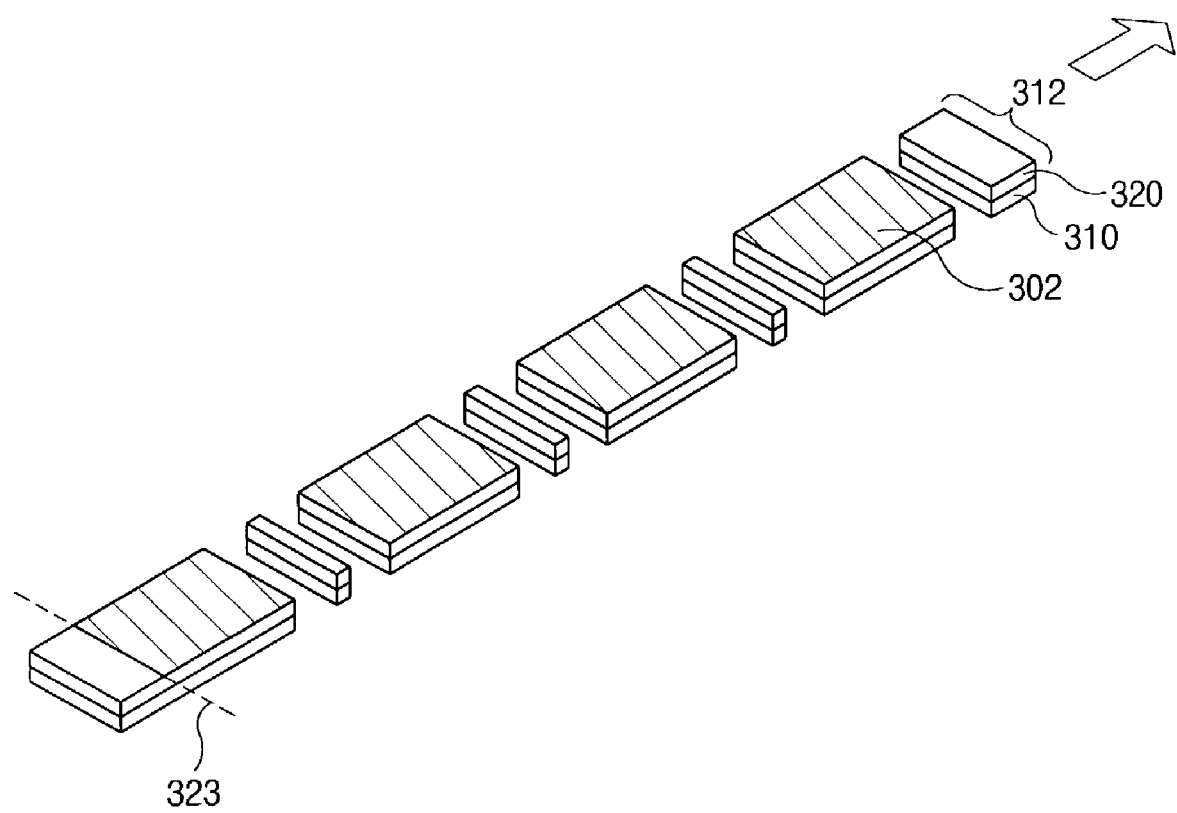

As shown in FIG. 7D, the separated second region 312 is rotated by 90° and a third scribing line 323 is sequentially formed on the second region 312. Accordingly, the unit LCD panels 302 having a second size are separated by cutting the second region 312 along the third scribing line 323.

The third scribing line 323 is sequentially formed along the shorter or longer side of the LCD panels 302 formed in the second region 312 of the first and second mother substrates 310 and 320. The LCD panels 302 on the first and second mother substrates 310 and 320 are separated into each panel, and the remaining region will be discarded. In the second embodiment of the present invention, the second region 312 is separated along the shorter side of the LCD panels 302.

By using the method for cutting the LCD panel in accordance with the present invention, the LCD panels having different sizes on the large sized mother substrate are fabricated and cut into individual unit LCD panels. Accordingly, a region of the mother substrate to be discarded is minimized, and efficiency in using the mother substrate is maximized. Therefore, yield is improved, and product cost is decreased.

Although the embodiments of the present invention describes that the three LCD panels and four LCD panels are formed with different sizes on the mother substrate, the present invention may be embodied in several forms without departing from the spirit or essential characteristics thereof. Therefore, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for cutting a liquid crystal display panel, comprising:

forming a plurality of unit liquid crystal display panels on first and second mother substrates, wherein the unit liquid crystal display panels have at least two different sizes and are respectively arranged in at least a first region and a second region different from the first region of the first and second mother substrates;

forming a plurality of first scribing lines on a surface of the first mother substrate;

rotating the first and second mother substrates by about 90°; and forming a plurality of second scribing lines on the surface of the first mother substrate;

wherein some of the plurality of second scribing lines are formed only in the first region to prevent the unit liquid crystal display panels in the second region from being damaged by the said plurality of second scribing lines and some of the plurality of second scribing lines are formed only in the second region to prevent the unit liquid crystal display panels in the first region from being damaged by the said plurality of second scribing lines.

2. The method of claim 1, further comprising:

overturning the first and second mother substrates after forming the plurality of second scribing lines on the surface of the first mother substrate; and forming a plurality of first and second scribing lines on a surface of the second mother substrate.

3. The method of claim 1, further comprising:

rotating the first and second mother substrates by 90° prior to forming the plurality of first scribing lines, if the first scribing lines are parallel to a shorter side of the first and second mother substrates.

4. The method of claim 1, wherein the first scribing lines divide a region for forming the unit liquid crystal display panels and a region to be discarded.

5. The method of claim 1, wherein the first scribing lines are formed in a straight line.

6. The method of claim 1, wherein the second scribing lines divide each unit liquid crystal display panel.

7. The method of claim 1, wherein the second scribing lines are formed in a straight line.

8. A method of manufacturing a liquid crystal display device, comprising:

forming a plurality of unit liquid crystal panels on first and second mother substrates, wherein the unit liquid crystal display panels have at least two different sizes and are respectively arranged in at least a first region and a second region different from the first region of the first and second mother substrates;

dispensing a liquid crystal on either the first and second mother substrates;

bonding the first and second mother substrates;

forming a plurality of first scribing lines on a surface of the first mother substrate; and forming a plurality of second scribing lines to be perpendicular to the first scribing lines on the surface of the first mother substrate, wherein some of the plurality of second scribing lines are formed only in the first region to prevent the unit liquid crystal display panels in the second region from being damaged by the said plurality of second scribing lines and some of the plurality of second scribing lines are formed only in the second region to prevent the unit liquid crystal display panels in the first region from being damaged by the said plurality of second scribing lines.

9. The method of claim 8, further comprising:

overturning the first and second mother substrates after forming the plurality of second scribing lines on the surface of the first mother substrate; and forming a plurality of first and second scribing lines on a surface of the second mother substrate.

10. The method of claim 8, further comprising:

rotating the first and second mother substrates by about 90° prior to forming the plurality of first scribing lines, if the first scribing lines are parallel to a shorter side of the first and second mother substrates.

11. The method of claim 8, wherein the first scribing lines divide a region for forming the unit liquid crystal display panels and a region to be discarded.

12. The method of claim 8, wherein the second scribing lines divide each unit liquid crystal display panel.

13. A method for manufacturing a liquid crystal display panel, comprising:

forming a plurality of unit liquid crystal display panels on first and second mother substrates, wherein the unit liquid crystal display panels have at least two different sizes and are respectively arranged in at least a first region and a second region different from the first region of the first and second mother substrates;

dispensing a liquid crystal on either the first and second mother substrates;

bonding the first and second mother substrates;

forming a plurality of first scribing lines on a surface of the first mother substrates;

rotating the first and second mother substrates by about 90°; and forming a plurality of second scribing lines on the surface of the first mother substrate;

wherein some of the plurality of second scribing lines are formed only in the first region to prevent the unit liquid crystal display panels in the second region from being damaged by the said plurality of second scribing lines and some of the plurality of second scribing lines are formed only in the second region to prevent the unit liquid crystal display panels in the first region from being damaged by the said plurality of second scribing lines.

14. The method of claim 13, further comprising:

overturning the first and second mother substrates after forming the plurality of second scribing lines on the surface of the first mother substrate; and forming a plurality of first and second scribing lines on a surface of the second mother substrate.

15. The method of claim 14, wherein the first scribing lines on the surface of the second mother substrate correspond to the first scribing lines on the surface of the first mother substrate and the second scribing lines on the surface of the second mother substrate correspond to the second scribing lines on the surface of the first mother substrate.

16. The method of claim 13, further comprising:

rotating the first and second mother substrates by about 90° prior to forming the plurality of first scribing lines, if the first scribing lines are parallel to a shorter side of the first and second mother substrates.

17. The method of claim 13, wherein the first scribing lines divide a region for forming the unit liquid crystal display panels and a region to be discarded.

18. The method of claim 13, wherein the first scribing lines are formed in a straight line.

19. The method of claim 13, wherein the second scribing lines divide each unit liquid crystal display panel.

20. The method of claim 13, wherein the second scribing lines are formed in a straight line.

* * * * *